(12) United States Patent
Kar et al.

(10) Patent No.: US 9,523,052 B2
(45) Date of Patent: Dec. 20, 2016

(54) GASIFICATION REACTOR WITH SUPERHEATER AND SUPERHEATED STEAM LINE

(71) Applicant: SHELL OIL COMPANY, Houston, TX (US)

(72) Inventors: Ibrahim Kar, Köln (DE); Manfred Schmitz-Goeb, Gummersbach (DE)

(73) Assignee: SHELL OIL COMPANY, Houston, TX (US)

( * ) Notice: Subject to any disclaimer, the term of this patent is extended or adjusted under 35 U.S.C. 154(b) by 178 days.

(21) Appl. No.: 14/345,667

(22) PCT Filed: Sep. 19, 2012

(86) PCT No.: PCT/EP2012/068385
§ 371 (c)(1),
(2) Date: Mar. 19, 2014

(87) PCT Pub. No.: WO2013/041543
PCT Pub. Date: Mar. 28, 2013

(65) Prior Publication Data
US 2014/0223823 A1  Aug. 14, 2014

(30) Foreign Application Priority Data

Sep. 20, 2011 (EP) .................... 11181992

(51) Int. Cl.
*B01J 7/00* (2006.01)
*C10J 3/80* (2006.01)
(Continued)

(52) U.S. Cl.
CPC .. *C10J 3/80* (2013.01); *C10J 3/00* (2013.01); *C10J 3/723* (2013.01); *F22B 1/1846* (2013.01); *F22B 37/22* (2013.01); *F22D 1/32* (2013.01); *F22G 5/16* (2013.01); *C10J 2300/1687* (2013.01); *C10J 2300/1892* (2013.01); *Y02P 20/129* (2015.11)

(58) Field of Classification Search
CPC ................. C10J 2300/0976; C10J 2300/1807; C10J 2300/1892; C10J 3/86; C10J 2300/1687; F22G 5/16; F22G 1/34
See application file for complete search history.

(56) References Cited

U.S. PATENT DOCUMENTS 3,818,869 A * 6/1974 Blaskowski ............. C10J 3/466
110/229
4,247,302 A 1/1981 Woldy et al.
(Continued)

FOREIGN PATENT DOCUMENTS

DE 3107659 9/1982
EP 0272378 6/1988

*Primary Examiner* — Imran Akram

(57) ABSTRACT

A process and a reactor for the of a carbonaceous feed. The reactor has a reactor chamber; steam generating heat exchange units; at least one steam drum; and recirculation lines for circulating water and steam between one or more of the heat exchange units and the steam drum. The steam drum further includes a steam feed line for transporting steam via a heat exchange unit and a superheated steam line to a superheated steam header. The superheated steam line is split into a return line leading to a heat exchange line through the steam drum, and a header feed line.

11 Claims, 2 Drawing Sheets

Figure 1:
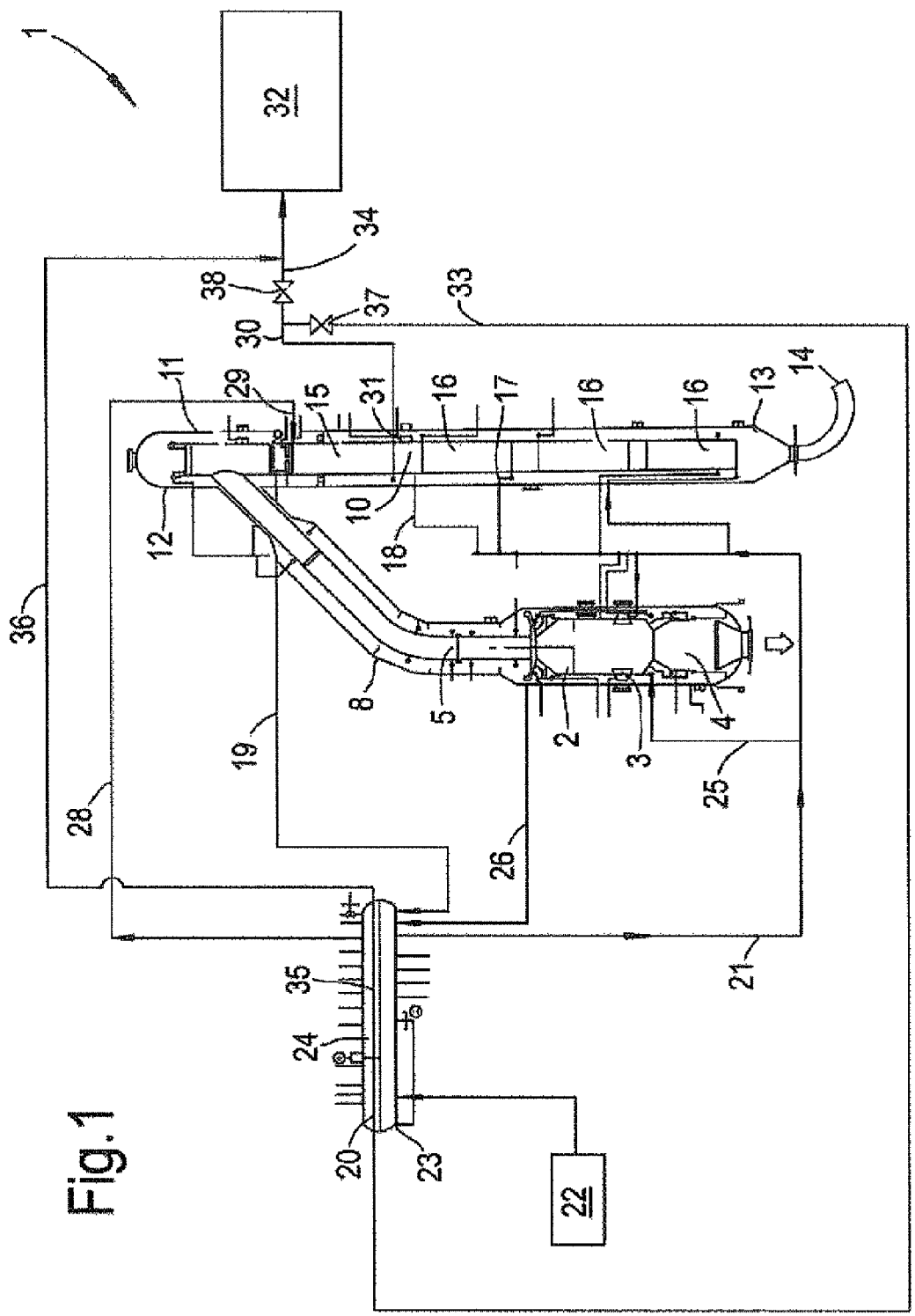

(51) Int. Cl.
*C10J 3/00* (2006.01)
*C10J 3/72* (2006.01)
*F22B 37/22* (2006.01)
*F22B 1/18* (2006.01)
*F22D 1/32* (2006.01)
*F22G 5/16* (2006.01)

(56) References Cited

U.S. PATENT DOCUMENTS

| | | |
|---|---|---|
| 4,569,680 A | 2/1986 | Darling et al. |
| 2008/0115478 A1* | 5/2008 | Sullivan ............... B01D 53/229 60/39.12 |
| 2008/0172941 A1* | 7/2008 | Jancker ................... C10J 3/485 48/73 |
| 2010/0011664 A1* | 1/2010 | Ariyapadi ................. C10J 3/00 48/128 |
| 2010/0263607 A1 | 10/2010 | Travaly et al. |
| 2011/0283703 A1* | 11/2011 | Gu ........................... C10J 3/482 60/670 |
| 2013/0036720 A1* | 2/2013 | Haari ..................... F01K 13/02 60/39.12 |

\* cited by examiner

GASIFICATION REACTOR WITH SUPERHEATER AND SUPERHEATED STEAM LINE

PRIORITY CLAIM

The present application is the National Stage (§371) of International Application No. PCT/EP2012/068385, filed 19 Sep. 2012, which claims priority from European application no. 11181992.6, filed 20 Sep. 2011, the disclosures of which are incorporated herein by reference.

The present invention relates to a gasification reactor comprising steam generating heat exchange elements. The invention also pertains to a process of controlling a steam flow in such a gasification reactor.

Gasification reactors can for instance be used for the production of synthetic gas by partial combustion of a carbonaceous feed, such as pulverized coal, oil, biomass, gas or any other type of carbonaceous feed. Synthetic gas typically leaves the gasification reactor at high temperatures, e.g., 1300° C. or even higher. To cool the gas, the gas is guided along heat exchange elements. If water is used as a cooling medium the heat exchangers can be used to generate steam. This way, waste heat generated the gasification process can be used economically and the overall efficiency of the process is substantially improved.

The generated steam from waste heat recovery heat exchangers is generally recollected as a water and steam mixture in a steam drum. Water from the steam drum is subsequently recycled to the heat exchangers. Steam in the steam drum can be discharged to a steam header. If the steam is saturated steam it can be transported to the steam header via a super heater where it forms superheated steam.

To reduce or avoid corrosion and damage of associated equipment resulting from thermal loads, the temperature of the collected superheated steam should not be too high.

It is an object of the present invention to improve the economic efficiency of the process as a whole, and to reduce damage resulting from thermal loads.

The object of the invention is achieved with a gasification reactor comprising a reactor chamber, one or more steam generating heat exchange units, at least one steam drum for recollecting the generated steam and recirculation lines for circulating water and steam between one or more of the heat exchange units and the steam drum. The steam drum further comprises a steam feed line for routing saturated steam via a superheater and a superheated steam line to a superheated steam header, wherein the superheated steam line is split into a return line leading to a heat exchange line through the steam drum, and a header feed line. One or more valves are provided for selectively opening or closing the return line or the header feed line.

This makes it possible to recirculate steam, for instance if it is too hot, to the heat exchange line through the steam drum, where heat can be transferred to water in the steam drum. This way, additional steam can be generated and the risk of overheating equipment downstream of the super heater can substantially be reduced.

The heat exchange line through the steam drum can for instance be connected to a secondary superheated steam feed line leading to the superheated steam header.

The secondary superheated steam feed line may for instance join the header feed line before opening into the superheated steam feed header, so the cooler superheated steam from the secondary line can be pre-mixed with the superheated steam from the header feed line before it enters the header.

Upstream of the return line, the superheated steam feed line can be provided with one or more temperature sensors and wherein one or more valve control units are configured to control flow via the return line and the header feed line as a function of the measured temperature.

Optionally, the heat exchange line through the steam drum can be connected to a line to a cross flow heat exchanger for pre-heating oxygen, while steam is condensed. The cross flow heat exchanger can be connected to an oxygen feed line feeding the pre-heated oxygen to the reactor chamber. The use of pre-heated oxygen improves the combustion efficiency of the reactor. Due to the use of steam for pre-heating the oxygen no external energy input is required for pre-heating the oxygen.

In a further refinement a return line returns steam condensate from the cross flow heat exchanger to the steam drum via a pressurizer, e.g., for re-use in the waste heat recovery circuit.

In a specific embodiment the heat exchange unit between the steam drum and the super heated steam header comprises a waste heat recovery unit downstream of the reactor chamber. This waste heat recovery unit can for example be the first of a series of downstream waste heat recovery units, particularly for transferring heat from syngas to steam.

The heat exchange units can for instance comprise a water-cooled membrane wall built of parallel cooling lines interconnected to form a gastight wall. Similarly, the reactor chamber may comprise a membrane wall built of parallel cooling lines interconnected to form a gastight wall. This results in a membrane wall effectively protected against over heating and which can also be used for generating steam.

The invention also pertains to a process of controlling a flow of superheated steam to a super heated steam header, wherein saturated steam from a steam drum is fed into a superheater and subsequently via a feed line to the superheated steam header, wherein superheated steam of a temperature exceeding an upper limit is detoured to a heat exchange line through the steam drum.

Subsequently, after passing the heat exchange line through the steam drum, the steam can be fed into the superheated steam header and/or it can be passed through a cross flow heater crossing a counterflow of oxygen and wherein the oxygen is subsequently fed to burners in the reactor chamber. After passing the cross flow heat exchanger the steam can subsequently be fed back into the steam drum via a pressurizer.

Figure 2:
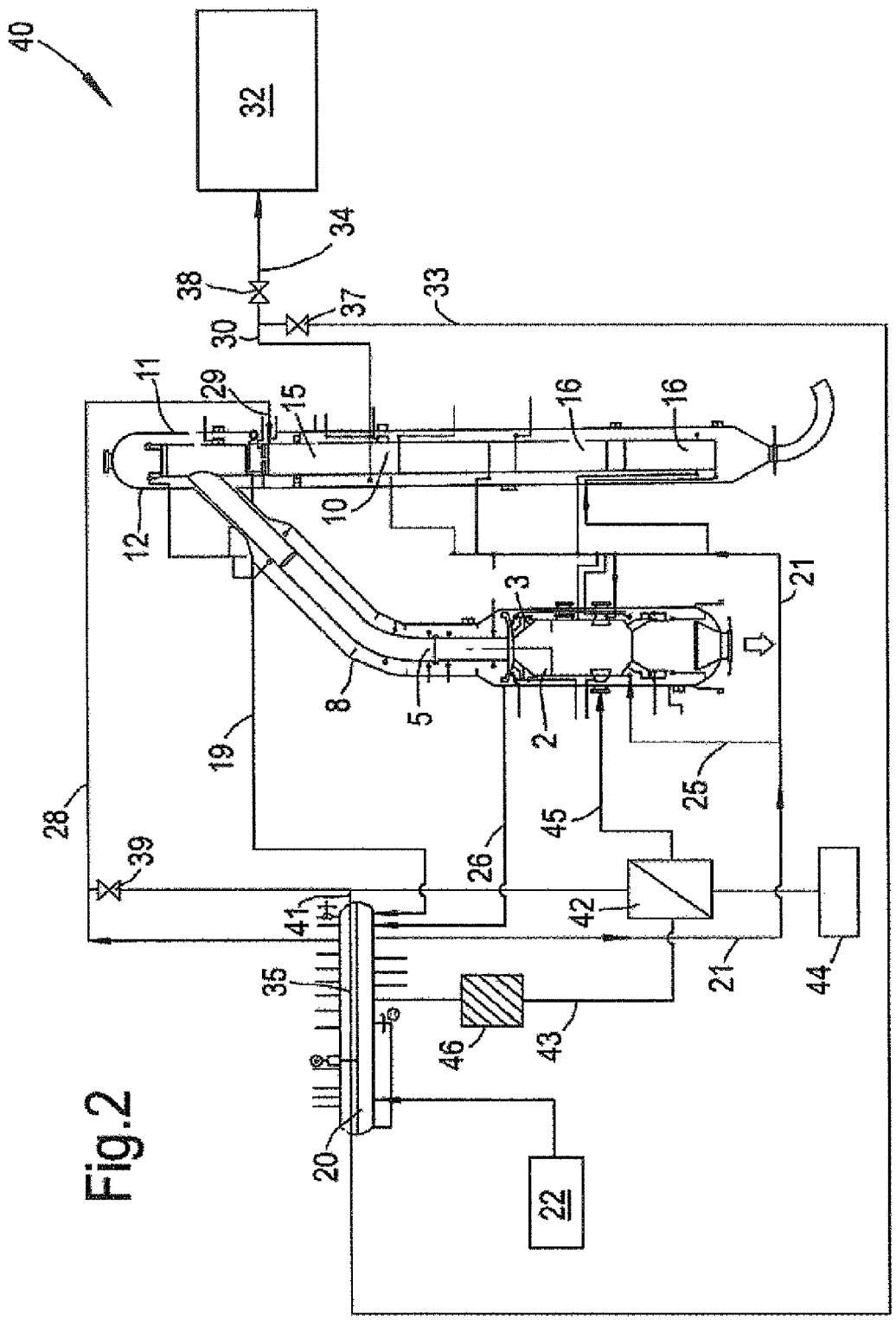

Exemplary embodiments of the invention will now be described by reference to the accompanying drawing, in which:

FIG. 1: shows schematically an exemplary embodiment of a gasification reactor;

FIG. 2: shows schematically a second exemplary embodiment of a gasification reactor.

FIG. 1 shows a gasification reactor 1 for the partial combustion of a carbonaceous feed to produce synthetic gas. The reactor 1 comprises a reactor chamber 2 with a membrane wall 3 formed by parallel cooling lines (not shown) interconnected to form a gastight wall structure. The cooling lines may for instance be vertical lines or helically wound parallel lines. Water flows through the cooling lines during the combustion process to reduce thermal loads on the membrane wall 3. The water will leave the cooling lines as steam, or as a mixture of steam and water. The lower end of the reactor chamber 2 opens into a slag collection bath 4. The upper end of the reactor chamber 2 opens into a discharge channel 5. The reactor chamber 2, the slag collection bath 4 and the discharge channel 5 are encased in a pressure vessel 8.

The top end of the discharge channel 5 opens into a the upper end of a cooling channel 10 within a cylindrical pressure vessel 11. The pressure vessel 11 comprises a closed top end 12 and a lower end 13 connected to a syngas discharge line 14. The cooling channel 10 runs from the closed pressure vessel top end 12 to the syngas discharge line 14 and comprises a super heater 15 and a series of lower heat exchange units 16. The super heater 15 and the heat exchange units 16 are built of parallel cooling lines (not shown) interconnected to form gastight wall structures.

Each one of the series of lower heat exchange units 16 has at least one inlet 17 and at least one outlet 18. The inlets 17 are connected to a steam drum 20 via a line 21. In the steam drum water is separated from steam. The steam drum 20 is also connected to each one of the outlets 18 via lines 19, and to a boiler feed water steam supply unit 22. The steam drum 20 comprises a mixture of water 23 and steam 24. Water flows from the steam drum 20 via lines 21 to the inlets 17 of the heat exchange units 16. Heat from syngas passing through the heat exchange units 16 is transferred to the water in the cooling lines and steam is generated. The steam is returned to the steam drum 20 via lines 19.

Similarly, water is transported from the steam drum 20 via water supply lines 25 to the cooling lines of the membrane wall 3. In the embodiment shown, the lines 25 branch off from line 21. Alternatively, lines 25 can be separate lines directly connecting the steam drum 20 with the cooling lines of the membrane wall 3. The water cools the membrane wall 3 and steam is generated and returned to the steam drum 20 via return lines 26.

A steam line 28 runs from the steam drum 20 to an inlet 29 of the super heater 15. A super heated steam line 30 runs from an outlet 31 of the super heater 15 to a super heated steam header 32.

The superheated steam feed line 30 is split into a return line 33 and a header feed line 34. The return line 33 leads to a heat exchange line 35 through the steam drum 20. The heat exchange line 35 through the steam drum 20 is connected to a secondary superheated steam feed line 36 leading to the superheated steam header 32. The secondary superheated steam feed line 36 joins the header feed line 34 before the point where the feed line 34 opens into the superheated steam header 32.

Valves 37, 38 are configured for selectively opening or closing the return line 33 or the header feed line 34.

Upstream of the return line 33 the superheated steam feed line 30 is provided with one or more temperature sensors (not shown). A valve control unit (not shown) is configured to control the flow via the return line 33 and the header feed line 34 as a function of the measured temperature of the supplied superheated steam. If the measured temperature of the superheated steam in the superheated steam feed line 30 exceeds a defined upper limit, valve 37 is opened while valve 38 is closed. The superheated steam is detoured via the return line 33 and the heat exchange line 35 through the steam drum 20, where the superheated steam cools down to an acceptable temperature level. Subsequently, the superheated steam is transported via secondary superheated steam feed line 34 to the superheated steam header 32. This way, excess heat is used to generate additional steam in the steam drum. This additionally produced steam provides better cooling to the super heater and consequently lowers the super heater steam outlet temperature in line 30. This way, the temperature of the superheated steam can effectively be kept sufficiently low to avoid overheating of equipment resulting in increased life time of the reactor parts.

FIG. 2 shows an alternative embodiment of a gasification reactor 40. In FIG. 2 the same referential numbers are used for parts which are the same as in the FIG. 1 embodiment. As in the embodiment of FIG. 1, the gasification reactor 40 of FIG. 2 comprises a reactor chamber 2 with a membrane wall 3 formed by parallel cooling lines (not shown) interconnected to form a gastight wall structure. The cooling channel 10 comprises a super heater 15 and a series of lower heat exchange units 16, which are connected to a steam drum 20 by water supply lines 21 and steam return lines 19. Similarly, water flows from the steam drum 20 to the cooling lines of the membrane wall 3 to return as steam to the steam drum 20 via steam return lines 26.

A steam line 28 runs from the steam drum 20 to the super heater 15. A super heated steam line 30 runs from the super heater 15 to a super heated steam header 32.

The superheated steam feed line 30 is split into a return line 33 and a header feed line 34. The return line 33 leads to a heat exchange line 35 through the steam drum 20. The heat exchange line 35 through the steam drum 20 is connected to a line 41 towards a cross flow heat exchange unit 42. In the cross flow heat exchange unit 42 heat is transferred from the steam to a counterflow of oxygen. Steam condenses and the condensed steam is subsequently returned via return line 43 to the steam drum 20 via a pressurizer 46 to compensate for pressure loss of the steam during passage of the cross flow heat exchange unit 42. The oxygen flow is supplied from an oxygen source 44, such as an air separator. After passing the cross flow heat exchange unit 42 the heated oxygen is transported to the reactor chamber 2 via oxygen line 45.

In a further possible alternative embodiment the steam from the cross flow heat exchange unit 42 is not returned to the steam drum 20, but transported to a condensate collection unit (not shown). In that case, no pressurizer 46 is needed.

In operating conditions with low superheated steam temperatures, in line 30 saturated steam can be supplied via valve 39 for use with the oxygen preheater instead of—or in addition to—superheated steam from lines 33 and 41.

That which is claimed is:
1. A gasification reactor comprising:
   a reactor chamber;
   a cooling channel connected to a syngas outlet of the reactor chamber, the cooling channel comprising a series of steam generating heat exchange units, at least one of the heat exchange units being a superheater;
   at least one steam drum;
   recirculation lines for circulating water and steam between one or more of the heat exchange units and the steam drum,
   a superheated steam header,
   a steam feed line configured to transport steam from the steam drum to the superheater,
   a superheated steam line configured to transport superheated steam from the superheater to the superheated steam header,
   the superheated steam line being split into a return line leading to a heat exchange line through the steam drum, and a header feed line leading to the superheated steam header,
   a first valve configured to selectively open or close the return line,
   a second valve configured to selectively open or close the header feed line, and a secondary superheated steam feed line connected to an outlet of the heat exchange line through the steam drum and leading to the superheated steam header, the secondary superheated steam feed line being connected to the header feed line between the second valve and the superheated steam header.

2. A gasification reactor according to claim 1, the superheated steam feed line upstream of the return line being provided with one or more temperature sensors and the reactor comprising one or more valve control units configured to open or close the return line and the header feed line respectively responsive to the measured temperature.

3. A gasification reactor according to claim 1, the heat exchange line through the steam drum being connected to a line to a cross flow heat exchanger configured to pre-heat oxygen, the cross flow heat exchanger being connected to an oxygen feed line configured to feed the pre-heated oxygen to one or more burners in the reactor chamber.

4. A gasification reactor according to claim 3, comprising a return line configured to return condensed steam from the cross flow heat exchanger to the steam drum via a pressurizer.

5. A gasification reactor according to claim 1, the heat exchange unit between the steam drum and the super heated steam header being a waste heat recovery unit downstream of the reactor chamber.

6. A gasification reactor according to claim 5, the waste heat recovery unit being the first in a series of downstream waste heat recovery units.

7. A gasification reactor according to claim 1, at least one of the heat exchange units comprising a water cooled membrane wall built of parallel cooling lines interconnected to form a gastight wall.

8. Process of reducing the temperature of a flow of superheated steam to a super heated steam header in a gasification reactor according to claim 1, wherein saturated steam from a steam drum is fed into a superheater and subsequently via a feed line to the superheated steam header, wherein superheated steam of a temperature exceeding an upper limit is detoured to a heat exchange line through the steam drum to create additional steam in the steam drum.

9. A process according to claim 8 wherein steam after passing the heat exchange line through the steam drum is subsequently fed into the superheated steam header.

10. A process according to claim 8 wherein steam after passing the heat exchange line through the steam drum is subsequently passed through a cross flow heater crossing a counterflow of oxygen and wherein the oxygen is subsequently fed to one or more burners in the reactor chamber.

11. A process according to claim 10 wherein steam after passing the cross flow heat exchanger is subsequently fed back into the steam drum via a pressurizer.

* * * * *